United States Patent
Berger

(10) Patent No.: US 7,226,388 B2
(45) Date of Patent: Jun. 5, 2007

(54) ENGINE SHUT-DOWN CONTROL TO REDUCE OR ELIMINATE ENGINE RUN-ON

(75) Inventor: Alvin Berger, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 11/160,604

(22) Filed: Jun. 30, 2005

(65) Prior Publication Data

US 2007/0004555 A1    Jan. 4, 2007

(51) Int. Cl.
*B60W 10/04* (2006.01)
(52) U.S. Cl. .................................................. 477/115
(58) Field of Classification Search ................ 477/99, 477/115
See application file for complete search history.

(56) References Cited

U.S. PATENT DOCUMENTS 6,709,363 B2 *  3/2004  Shimabukuro et al. ..... 477/115

FOREIGN PATENT DOCUMENTS

JP          9026027          1/1997

* cited by examiner

*Primary Examiner*—Dirk Wright
(74) *Attorney, Agent, or Firm*—Diana Brehob; Bir Law, PLC; David S. Bir

(57) ABSTRACT

A vehicle powertrain including a multiple cylinder internal combustion engine and a controllable transmission controls engine shutdown by shutting off a fuel supply device or devices such as a fuel pump or fuel injector(s) while the transmission is in gear to load the engine and reduce or eliminate engine run-on. The transmission may be controlled to couple the input shaft to a stationary component or simultaneously engage clutches corresponding to different gear ratios to provide a holding torque on the engine.

20 Claims, 2 Drawing Sheets

ENGAGED CLUTCHES

| GEAR/MODE | C1 | C2 | C3 | C4 | C5 | C6 |
|---|---|---|---|---|---|---|
| 1 | X | | | | X | |
| 2 | X | | | X | | |
| 3 | X | | X | | | |
| 4 | X | X | | | | |
| 5 | | X | X | | | |
| 6 | | X | | X | | |
| R | | | | | X | X |
| LK1 | X | | | | X | X |
| LK2 | X | X | X | | | X |

ENGINE SHUT-DOWN CONTROL TO REDUCE OR ELIMINATE ENGINE RUN-ON

BACKGROUND OF THE INVENTION

1. Field of the Invention

The present invention relates to systems and methods for shutting down an internal combustion engine coupled to a microprocessor controlled transmission to reduce or eliminate engine run-on.

2. Background Art

Engine run-on is a condition in an internal combustion engine where one or more combustion events occur in one or more engine cylinders after the ignition or key switch is turned to an off or shutdown position and the injector fuel flow is shut off. This condition may occur under certain operating conditions when a combustible mixture enters or remains in the intake or in one or more engine cylinders after the fuel injectors are shut off. While fuel may be supplied by various sources depending on the particular engine technology and design implementation, one source of such a combustible mixture may be the fuel and/or oil provided to the intake by a positive crankcase ventilation (PCV) system, for example.

Previous automated solutions to reduce engine run-on have included reducing inlet airflow by closing the throttle and idle bypass valves (for throttled engine applications), or engaging the torque converter clutch or lock-up clutch of an automatic transmission so the torque provided by the engine is not sufficient to maintain the run-on condition as disclosed in Japanese Pat. No. JP 9026027, for example. Similarly, the vehicle operator can place (or keep) the transmission in a driving gear while turning off the ignition switch so that the load imposed upon the engine by the transmission counters the torque provided by the engine in the run-on mode to stop the engine.

SUMMARY OF THE INVENTION

The present invention includes a vehicle powertrain having a multiple cylinder internal combustion engine and a controllable transmission, one or more microprocessor based controllers control engine shutdown by shutting off the fuel injectors while the transmission is in gear to load the engine and reduce or eliminate engine run-on. The transmission may be controlled to couple the input shaft to a stationary component by simultaneously engaging clutches corresponding to different gear ratios to provide a holding torque on the engine.

The present invention provides a number of advantages. For example, the present invention may be used in both throttled and unthrottled engines including spark-ignition and compression-ignition engines powered by various fuels to reduce or eliminate engine run-on. In addition, the present invention coordinates control of the engine and transmission during engine shutdown to use currently available powertrain components to reduce or eliminate engine run-on.

The above advantages and other advantages, objects, and features of the present invention, will be readily apparent from the following detailed description of the best mode for carrying out the invention when taken in connection with the accompanying drawings.

DETAILED DESCRIPTION OF THE PREFERRED EMBODIMENT(S)

Figure 1:
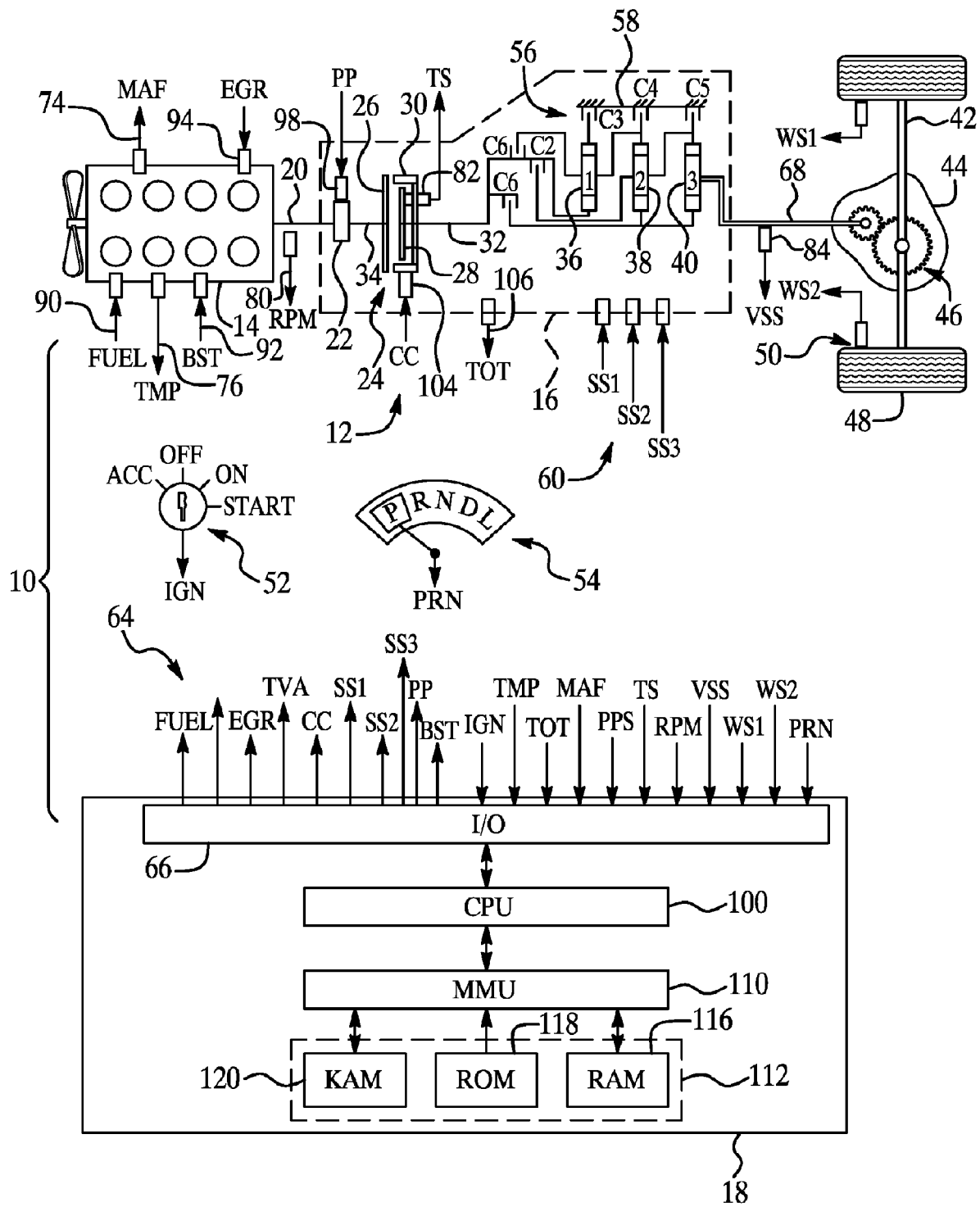
FIG. 1 is a block diagram illustrating a system and method for reducing or eliminating engine run-on according to various embodiments of the present invention.

FIG. 1 is a block diagram illustrating operation of a system or method for reducing or eliminating engine run-on according to the present invention. System 10 of FIG. 1 includes a vehicular powertrain 12 having an internal combustion engine 14 coupled to an electronically controlled fully or semi-automated transmission 16. Powertrain 12 may also include a controller 18 in communication with engine 14 and transmission 16 for providing various information and control functions. As those of ordinary skill in the art will appreciate, control functions performed by controller 18 may be divided between or among dedicated engine, transmission, and/or other component controllers depending upon the particular application and implementation. For multiple controller applications, the controllers may communicate using a standard data bus or via signal wires, for example, to exchange information relative to engine and transmission control consistent with the teachings of the present invention to reduce or eliminate engine run-on.

Engine 14 is connected to transmission 16 via crankshaft 20 which is connected to transmission pump 22 and/or torque converter 24. Preferably, torque converter 24 is a hydrodynamic torque converter including a pump or impeller 26 which is selectively fluidly coupled to a turbine 28. Torque converter 24 may also include a frictional converter clutch or bypass clutch 30 which provides a selective frictional coupling between turbine shaft 32 and input shaft 34. Although transmission 16 is depicted as a fully automatic electronically controlled transmission with a torque converter, the present invention may also be used with other types of fully automatic or semi-automatic transmissions that may or may not include a torque converter. For example, the present invention may be incorporated into a powertrain having a semi-automated mechanical transmission that uses one or more microprocessor controlled servo motors to automate shifting of an otherwise manually shifted mechanical transmission. Such transmissions may require additional hardware to implement various embodiments of the present invention as described in greater detail herein.

Figures 2, 3:
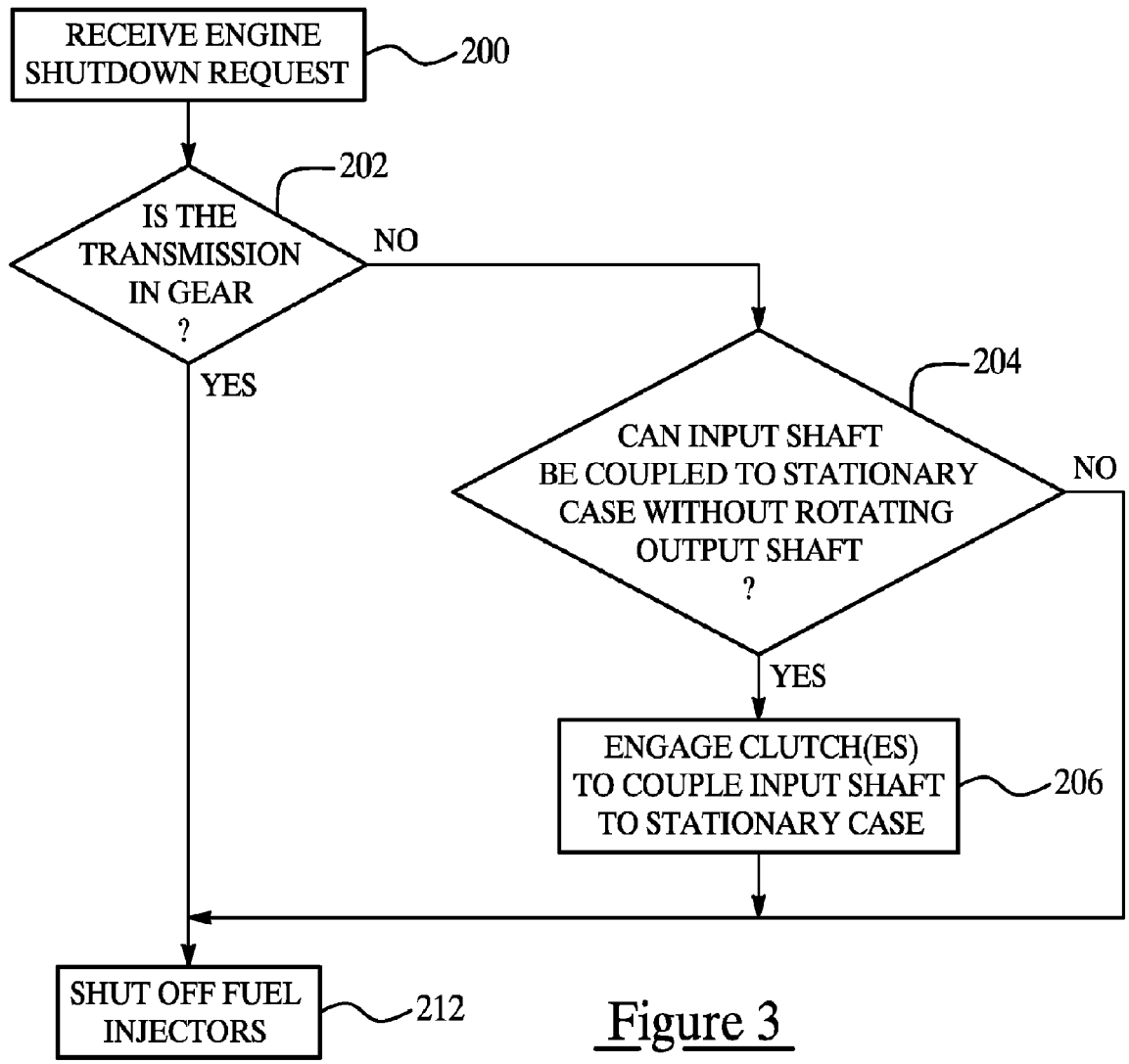
FIG. 2 is a chart illustrating engaged clutches for a representative electronically controlled automatic transmission for driving gears and locked gears to provide a sufficient load to reduce or eliminate engine run-on according to one embodiment of the present invention.
FIG. 3 is a block diagram illustrating operation of a system or method for reducing or eliminating engine run-on according to one embodiment of the present invention.

Transmission 16 includes a plurality of input-to-output ratios or gear ratios effected by various gears or gearsets, indicated generally by reference numerals 36, 38, and 40 and associated frictional elements such as clutches (C1–C6), bands, and the like, represented generally by reference numeral 56 as well known in the art. Gears 36, 38, and 40 in combination with torque converter 24 provide selective reduction or multiplication ratios between turbine shaft 32 and output shaft 68 based on engagement or activation of appropriate clutches C1–C6 as illustrated in FIG. 2. Transmission 16 is preferably electronically controlled via one or more shift solenoids, indicated generally by reference numeral 60 to select or engage one or more gear ratios according to the present invention, or to provide a holding torque using a stationary transmission component, such as transmission case 58, for example.

Depending upon the particular application, output shaft 68 may be coupled to one or more axles 42 via a final drive reduction or differential 44 which may include one or more gears, as indicated generally by reference numeral 46. Each axle 42 may include two or more wheels 48 having corresponding wheel speed sensors 50. Although a rear wheel drive application is illustrated in FIG. 1, the present invention is independent of the particular powertrain arrangement and is applicable to various other powertrains including but not limited to front wheel drive applications.

Powertrain 12 includes a plurality of sensors and actuators, indicated generally by reference numeral 64, in communication with corresponding input/output (I/O) ports 66 of controller 18 to sense or monitor the current operating and ambient conditions of powertrain 12 and control operation of engine 14 and transmission 16 according to the present invention. While the particular sensors and actuators 64 may vary depending upon the application and implementation, the representative system 10 includes a mass air flow sensor (MAF) 74 that provides an indication of the air mass flowing through the engine intake. A temperature sensor (TMP) 76 provides an indication of the engine coolant temperature, or alternatively engine oil temperature. An engine speed sensor (RPM) 80 monitors rotational speed of crankshaft 20. Similarly, a turbine speed sensor (TS) 82 monitors the rotational speed of the turbine 28 of torque converter 24. Another rotational speed sensor, vehicle speed sensor (VSS) 84, provides an indication of the speed of output shaft 68 which may be used to determine the vehicle speed based on the ratio of differential 44 and the size of wheels 48. Of course, wheel speed sensors (WS1 and WS2) 50 may be used to provide an indication of the vehicle speed as well.

An ignition switch 52 or similar device may be provided to control starting and running of engine 14 and various vehicle accessories by an appropriate signal or signals provided directly to various corresponding engine components (such as a starter motor, for example), and/or signals processed through controller 18. Ignition switch 52 provides a request for engine shutdown to controller 18 when turned to the "off" position as described in greater detail herein. A transmission gear selector 54 may be used by the vehicle operator to request or select a desired gear or driving mode and provides a corresponding signal (PRN) to controller 18. In the illustrated representative system 10, gear selector 54 includes positions for selection PARK (P), REVERSE (R), NEUTRAL (N), DRIVE (D) and LOW (L). However, the present invention is independent of the particular gears or modes available. The actual gear or state of transmission 16 is directed by controller 18 based on the selected or desired gear or mode indicated by selector 54 in addition to current engine, transmission, vehicle, and/or ambient operating conditions as described herein.

Various actuators 64 are used to provide control signals or to effect movement of various devices in powertrain 12. Actuators 64 may include actuators for timing and metering fuel (FUEL) 90, which may include a fuel pump and/or at least one electronically controlled fuel injector to provide direct or port fuel injection to the engine cylinders, for example. Actuators may also be used to control turbocharger boost pressure 92 (BST) and for setting the amount of exhaust gas recirculation (EGR) 94 for engines so equipped. Multiple cylinder internal combustion engine 14 may be a spark-ignition or compression-ignition engine depending on the application. Spark-ignition engines may include alternate or additional sensors, actuators, and drivers, such as those used to control spark timing and throttle valve position, for example. Automatic transmission 16 may be selectively regulated by controlling transmission pump or line pressure using an appropriate actuator (PP) 98 in combination with shift solenoids (SS1, SS2, and SS3) 60 which are used to select an appropriate gear ratio. Automatic transmission 16 may include a torque converter clutch 30 operable via an appropriate actuator or solenoid (CC) 104. A temperature senor 106 may be provided to determine the transmission oil temperature (TOT).

Controller 18 is a programmable controller implemented by a microprocessor-based controller or computer in the illustrated embodiments that provides integrated control of engine 14 and transmission 16 of powertrain 12. Of course, the present invention may be implemented using separate engine and transmission controllers that communicate appropriate parameters to provide coordinated control of the engine shutdown process to reduce or eliminate engine run-on according to the present invention. Controller 18 has a microprocessor 100, called a central processing unit (CPU), in communication with memory management unit (MMU) 110. MMU 110 controls the movement of data among the various computer readable storage media 112 and communicates data to and from CPU 100. The computer readable storage media may include volatile and nonvolatile storage in read-only memory (ROM) 118, random-access memory (RAM) 116, and keep-alive memory (KAM) 120, for example. KAM 120 may be used to store various operating variables while CPU 100 is powered down. The computer-readable storage media 112 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 100 in controlling system 10. The computer-readable storage media 112 may also include floppy disks, CD-ROMs, hard disks, and the like.

In operation, the vehicle operator requests or initiates engine shutdown by turning the ignition switch 52 to the OFF or ACC position while the engine is running. Controller 18 determines the currently selected gear based on the position of selector 54 in addition to the current engine, transmission, vehicle, and ambient operating conditions based on various sensors and actuators 64. For example, controller 18 may determine whether the vehicle is stationary or moving based on vehicle speed sensor (VSS) 84 and/or one or more wheel speed sensors (WS1, WS2) 50 in addition to determining ambient temperature (or intake air temperature), engine temperature, and the state of various shift solenoids 60 to determine the actual gear or mode of transmission 16. In response to the engine shutdown request and current ambient and operating conditions, controller 18 shuts off the fuel to the engine while transmission 16 is in gear to provide an additional load on engine 14 and reduce or eliminate engine run-on from any combustible mixture that may remain or be introduced to the engine cylinders or intake after the fuel is shut off, such as from a positive crankcase ventilation (PCV) system, for example. Fuel may be shut off by controlling the fuel pump and/or one or more fuel injectors depending on the particular application. In the embodiment illustrated in FIGS. 1 and 2, transmission 16 is considered to be in gear when selector 54 indicates REVERSE, DRIVE, or LOW, and corresponding clutches are engaged or activated for any of gears one through six or reverse.

If transmission 16 is not in gear, controller 18 may control transmission 16 to select a gear or mode to load engine 14 before shutting off the fuel. For example, as illustrated in FIG. 2, if the vehicle is stationary or below a predetermined speed and/or shift selector 54 indicates PARK or NEUTRAL, controller 18 may select a transmission locked state (LK1 or LK2) by appropriate activation of shift solenoids 60 to simultaneously engage clutches corresponding to more than one driving gear. Depending on the particular application, only one locked state may be provided, or multiple locked states or modes may be provided and activated in response to different ambient or operating conditions under which engine run-on is most likely. In the representative embodiment illustrated in FIG. 2, locked mode LK1 engages clutches corresponding to at least two different gear ratios, first gear and reverse in this example, to provide a holding torque or load on engine 14. These clutches effectively couple the input shaft and the output shaft to the stationary transmission case, preventing both the transmission input shaft and the output shaft from rotating and therefore putting an increased torque load on the engine. Similarly, locked mode LK2 engages clutches C1, C2, C3, and C6 to couple the transmission input shaft to the stationary transmission case. In some transmission designs, it may be possible to couple the input shaft to the stationary case while leaving the output shaft completely uncoupled from the rest of the transmission.

FIG. 3 is a diagram representing control logic and/or program code for embodiments of a system or method for reducing or eliminating engine run-on according to the present invention. As will be appreciated by one of ordinary skill in the art, the diagram illustrated in FIG. 3 may represent any of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. The control logic may be implemented in software which is executed by a microprocessor-based controller. Of course, the control logic may also be implemented by various types of logic devices that may use software, hardware, or a combination of software and hardware consistent with the teachings of the present invention.

An engine shutdown request is received as represented by block 200 of FIG. 3. The shutdown request may be received based on the ignition switch position, or based on other system operating conditions or modes. For example, a shutdown request may be generated by the engine or transmission controller to provide an engine protection feature. Operation of the present invention is independent of the particular event that initiates or causes generation of an engine shutdown request. In response to receiving an engine shutdown request, it is determined whether the transmission is currently in gear as represented by block 202. If the transmission is in gear, the fuel is shut off by shutting off the fuel injectors in this embodiment as represented by block 212. Otherwise, block 202 determines that the transmission is not in gear, and the shutdown procedure moves to block 204. For many automatic transmissions, the "P" or "N" states or modes would not provide a sufficient load on the engine to reduce or eliminate engine run-on when other operating conditions are favorable to induce engine run-on. If it is determined at block 204 that the operating conditions would allow the input shaft to be coupled to the stationary transmission case without rotation of the output shaft, then at block 206 appropriate action is taken to couple the input shaft to the case, and the fuel injectors are shut off at block 212. Whether or not the input shaft can be coupled to the case without rotation of the output shaft may depend upon various application and implementation specific considerations including the particular design of the transmission and/or vehicle control system. For example, block 204 may require zero wheel speed and an indication that the parking brake and/or vehicle service brakes are engaged to prevent rotation of the output shaft. Similarly, on vehicles equipped with a traction control system or an anti-lock braking system (ABS) that allows automated control of the vehicle service brakes, block 204 may command or control application of the service brakes to prevent the output shaft rotation. If the determination at block 204 is "NO", the fuel injectors are shut off at block 212 without engaging the clutch(es) at block 206.

If the aforementioned shutdown procedure results in an engine run-on condition, the engine can be restored to a running condition and an alternative shut-down procedure may be initiated. Such an alternative shut-down procedure could involve leaving the transmission in gear to force a "Y" decision at block 202, for example. Similarly, an alternative shutdown procedure could include engagement of the parking pawl, or operation of a parking brake or the service brakes as previously described to force a "YES" decision at block 204.

As such, the present invention provides a system and method for controlling engine shutdown to reduce engine run-on and is not dependent upon controlling airflow to the engine so that the present invention may be used in both throttled and non-throttled engine applications.

While the best mode for carrying out the invention has been described in detail, those familiar with the art to which this invention relates will recognize various alternative designs and embodiments for practicing the invention as defined by the following claims.

What is claimed is:

1. A method for controlling engine shutdown in a vehicle having an internal combustion engine with at least one fuel supply device and a transmission with an associated programmable controller, the method comprising:
   receiving an engine shutdown request; and
   shutting off the at least one fuel supply device while the transmission is in gear to reduce engine run-on.

2. The method of claim 1 further comprising controlling the transmission to select a gear that loads the engine before shutting off the at least one fuel supply device.

3. The method of claim 2 wherein the step of controlling the transmission comprises selecting a driving gear that couples an input shaft of the transmission to an output shaft of the transmission.

4. The method of claim 1 further comprising controlling the transmission to couple a transmission input shaft to a stationary transmission component.

5. The method of claim 4 wherein the step of controlling the transmission comprises controlling at least one transmission clutch to couple the transmission input shaft to a transmission case.

6. The method of claim 1 further comprising controlling the transmission to couple a transmission input shaft to a transmission output shaft while preventing the transmission output shaft from rotating.

7. The method of claim 1 wherein the transmission is an automatic transmission having a torque converter and wherein a transmission gear selector indicates neutral or park, the method further comprising controlling the transmission to engage clutches corresponding to at least two different gear ratios to load the engine.

8. A vehicle powertrain for reducing or eliminating engine run-on, the powertrain comprising:
   a microprocessor controlled multiple cylinder internal combustion engine having at least one fuel supply device; and
   a microprocessor controlled transmission coupled to the internal combustion engine, wherein the at least one fuel supply device is shut off in response to an engine shutdown request while the transmission is in gear.

9. The vehicle powertrain of claim 8 wherein the microprocessor controlled internal combustion engine comprises a compression ignition internal combustion engine with at least one fuel injector.

10. The vehicle powertrain of claim 8 wherein the microprocessor controlled transmission selects a gear ratio that loads the engine before the microprocessor controlled internal combustion engine shuts off the at least one fuel supply device.

11. The vehicle powertrain of claim 8 wherein the microprocessor controlled transmission selects a driving gear ratio that couples an input shaft of the transmission to an output shaft of the transmission in response to the engine shutdown request.

12. The vehicle powertrain of claim 8 wherein the microprocessor controlled transmission couples a transmission input shaft to a stationary transmission component in response to the engine shutdown request.

13. The vehicle powertrain of claim 12 wherein the microprocessor controlled transmission engages at least one transmission clutch to couple the transmission input shaft to a transmission case.

14. The vehicle powertrain of claim 8 wherein the microprocessor controlled transmission comprises a torque converter.

15. The vehicle powertrain of claim 8 wherein the microprocessor controlled transmission couples a transmission input shaft to a transmission output shaft while preventing the transmission output shaft from rotating in response to the engine shutdown request.

16. The vehicle powertrain of claim 8 wherein the microprocessor controlled transmission is an automatic transmission having a torque converter, a transmission gear selector indicating neutral or park, and wherein the transmission simultaneously engages clutches corresponding to at least two different gear ratios to load the engine.

17. A computer readable storage device having stored data representing instructions executable by a microprocessor to control a vehicle having a multiple cylinder internal combustion engine with a plurality of cylinders and at least one fuel supply device, and a microprocessor controlled transmission, the computer readable storage device comprising:
   code for shutting off the at least one fuel supply device while the transmission is in gear in response to an engine shutdown request to reduce engine run-on.

18. The computer readable storage device of claim 17 further comprising code for selecting a transmission gear ratio that loads the engine before shutting off the at least one fuel supply device.

19. The computer readable storage device of claim 17 further comprising code for controlling the transmission to couple a transmission input shaft to a stationary transmission component.

20. The computer readable storage device of claim 17 further comprising code for controlling the transmission to couple a transmission input shaft to a transmission output shaft while preventing the transmission output shaft from rotating.

* * * * *